United States Patent [19]
Miyata et al.

[11] Patent Number: 5,061,741
[45] Date of Patent: Oct. 29, 1991

[54] METHOD FOR PREPARING AN OIL-IN-WATER TYPE UNIFORM DISPERSION OF LIQUID DROPLETS AND POLYMERIZATION METHOD FOR PREPARING POLYMER BEADS OF UNIFORM PARTICLE SIZE

[75] Inventors: Eiji Miyata; Kiyoto Ando; Hiroshi Maeda; Hiroshi Arataki; Seiji Sudo, all of Kitakyushu, Japan

[73] Assignee: Mitsubishi Kasei Corporation, Tokyo, Japan

[21] Appl. No.: 611,507

[22] Filed: Nov. 13, 1990

[30] Foreign Application Priority Data

Nov. 16, 1989 [JP] Japan .................................. 1-297846

[51] Int. Cl.$^5$ .................. C08L 25/00; C08F 2/04; C08F 2/00
[52] U.S. Cl. ..................................... 523/319; 526/88; 526/918; 422/131; 521/29
[58] Field of Search .................. 422/131, 143, 311; 526/38, 88, 918; 521/29; 523/319

[56] References Cited

U.S. PATENT DOCUMENTS 3,922,255 11/1975 Koestler et al. ...................... 526/65
4,444,961 4/1984 Timm ..................................... 526/88

Primary Examiner—Paul R. Michl
Assistant Examiner—Patrick Niland
Attorney, Agent, or Firm—Oblon, Spivak, McClelland, Maier & Neustadt

[57] ABSTRACT

A method for preparing an oil-in-water type uniform dispersion of liquid droplets, which comprises ejecting into an aqueous medium containing a dispersion stabilizer, which forms a continuous phase and moves upwards, a hydrophobic liquid having a specific gravity smaller than the aqueous medium, through a nozzle plate having a plurality of perforations capable of ejecting the hydrophobic liquid upwards, to form liquid droplets of the hydrophobic liquid in the aqueous medium, wherein a nozzle plate having a number of perforations for ejection arranged in a ring form is used as said nozzle plate, and a polymerization method for preparing polymer beads of uniform particle size, which comprises applying the method for preparing an oil-in-water type uniform dispersion of liquid droplets.

36 Claims, 3 Drawing Sheets

Ring form

Tetragonal equal pitch arrangement

METHOD FOR PREPARING AN OIL-IN-WATER TYPE UNIFORM DISPERSION OF LIQUID DROPLETS AND POLYMERIZATION METHOD FOR PREPARING POLYMER BEADS OF UNIFORM PARTICLE SIZE

The present invention relates to a method for preparing an oil-in-water type uniform dispersion of liquid droplets. More particularly, it relates to a method for efficiently and constantly preparing an oil-in-water type dispersion of liquid droplets having a uniform size and a polymerization method for preparing polymer beads of uniform particle size.

Particles of a styrene-divinyl benzene copolymer have been widely used as matrix beads for ion exchange resins. For preparation of such copolymer particles, it has been common to employ a method which comprises charging a predetermined amount of a monomer and water together with a polymerization initiator and a dispersion stabilizer into a polymerization reactor and stirring the mixture to disperse liquid droplets of the monomer in water, followed by suspension polymerization at a polymerization temperature.

However, by such a method, there will be irregularities in the size of the droplets of the monomer dispersed in water. Consequently, there will be a drawback that the particle size distribution of the copolymer particles obtained by polymerization tends to be wide. Therefore, studies have been made for a method of obtaining a copolymer having a particle size as uniform as possible by adjusting the degree of stirring or by selecting a suitable dispersion stabilizer. However, it is very difficult to make a dispersion of liquid droplets having a uniform size and a very narrow distribution thereof by stirring.

Accordingly, a method has been proposed in which prior to the polymerization, an oil-in-water type dispersion having monomer liquid droplets of uniform size is prepared in a separate apparatus, and then this dispersion is charged into a polymerization reactor, followed by suspension polymerization.

As a typical method for preparing an oil-in-water type dispersion for this purpose, there may be mentioned, for example, a method wherein nozzles directed upwards are provided at a lower portion of a reactor filled with water, and a monomer is supplied through these nozzles into water to disperse liquid droplets of the monomer in water (U.S. Pat. No. 3,922,255).

Further, a method is also known wherein mechanical vibration is exerted to the monomer streams ejected from these nozzles to thereby disperse the droplets (U.S. Pat. No. 4,444,961).

According to the above method for preparing an oil-in-water type dispersion, it is possible to obtain liquid particles of the monomer having a uniform size. However, in order to adopt this method for industrial operation, it is necessary to provide a number of perforations for ejection to continuously and efficiently conduct the preparation of the dispersion.

When the number of perforations for ejection is small, there is no problem. However, when the number of perforations increases and they become highly dense, the streams of the hydrophobic liquid such as a monomer ejected from perforations in the vicinity of the center of the nozzle plate tend to sway, whereby it becomes difficult to let the monomer ejected from the respective perforations into water be formed into droplets in a constant state, and it becomes difficult to obtain liquid droplets of uniform size.

For example, it is common that a nozzle plate has uniform perforations over the entire surface as shown in FIG. 3. In such a case, it is necessary to limit the density of perforations to a certain level. Therefore, in order to obtain monomer droplets of uniform size, it is necessary to sacrifice the productivity to a substantial extent, which has made it difficult to employ this method for industrial operation.

It is an object of the present invention to provide a method for continuously and constantly preparing liquid droplets of a hydrophobic liquid of uniform size even when the number of perforations is increased in order to improve the productivity of the dispersion in an apparatus for preparing an oil-in-water type dispersion.

In particular, the present invention is based on a discovery that by employing a nozzle plate having perforations for ejecting a hydrophobic liquid arranged in a ring form around the center portion where no perforation is provided, i.e. without uniformly providing such perforations over the entire surface, it is possible to efficiently form an excellent dispersion without swaying of ejected hydrophobic liquid streams in the vicinity of perforations for ejection, whereby it is possible to provide a large amount of perforations for ejection as a whole and thereby to improve the productivity of the dispersion.

Thus, the present invention provides a method for preparing an oil-in-water type uniform dispersion of liquid droplets, which comprises ejecting into an aqueous medium containing a dispersion stabilizer, which forms a continuous phase and moves upwards, a hydrophobic liquid having a specific gravity smaller than the aqueous medium, through a nozzle plate having a plurality of perforations capable of ejecting the hydrophobic liquid upwards, to form liquid droplets of the hydrophobic liquid in the aqueous medium, wherein a nozzle plate having a number of perforations for ejection arranged in a ring form is used as said nozzle plate.

The present invention also provides a polymerization method for preparing polymer beads of uniform particle size, which comprises preparing an oil-in-water type uniform dispersion of liquid droplets of a polymerizable monomer by such a method and supplying such a dispersion to a polymerization step.

Now, the present invention will be described in further detail with reference to the preferred embodiments.

In the accompanying drawings:

FIGS. 1(1) and 1(2) show side views of different embodiments of the apparatus for preparing the dispersion to be employed in the present invention.

Figure 1:
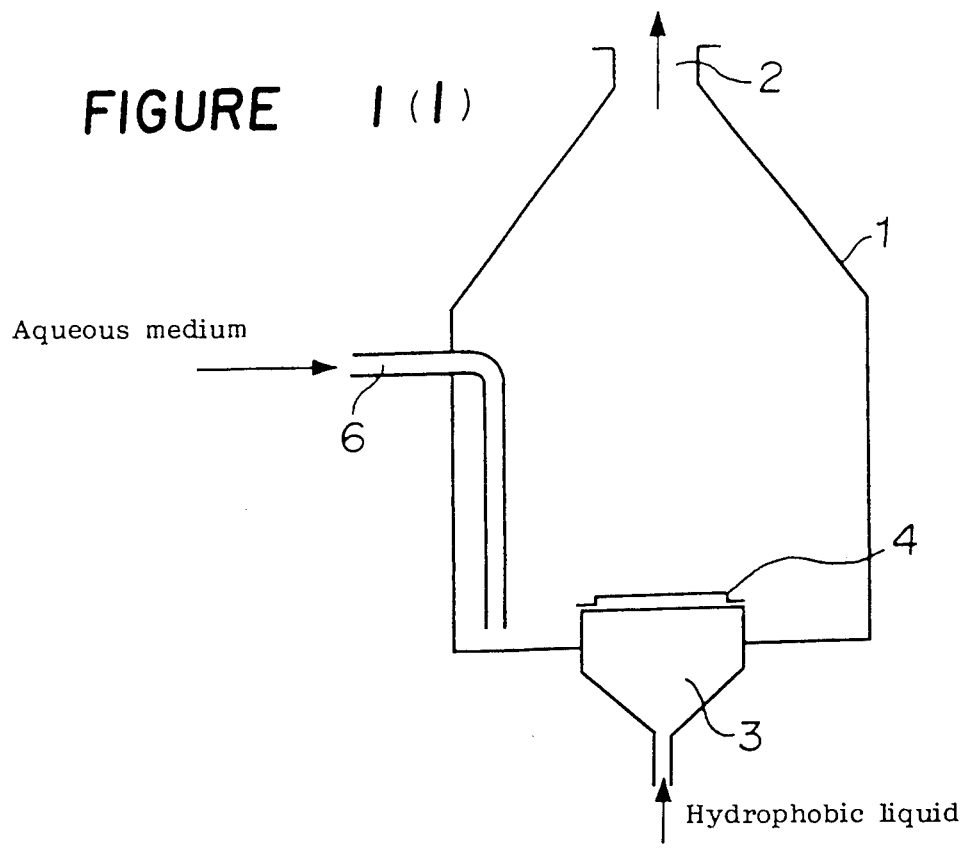
Figure 1:
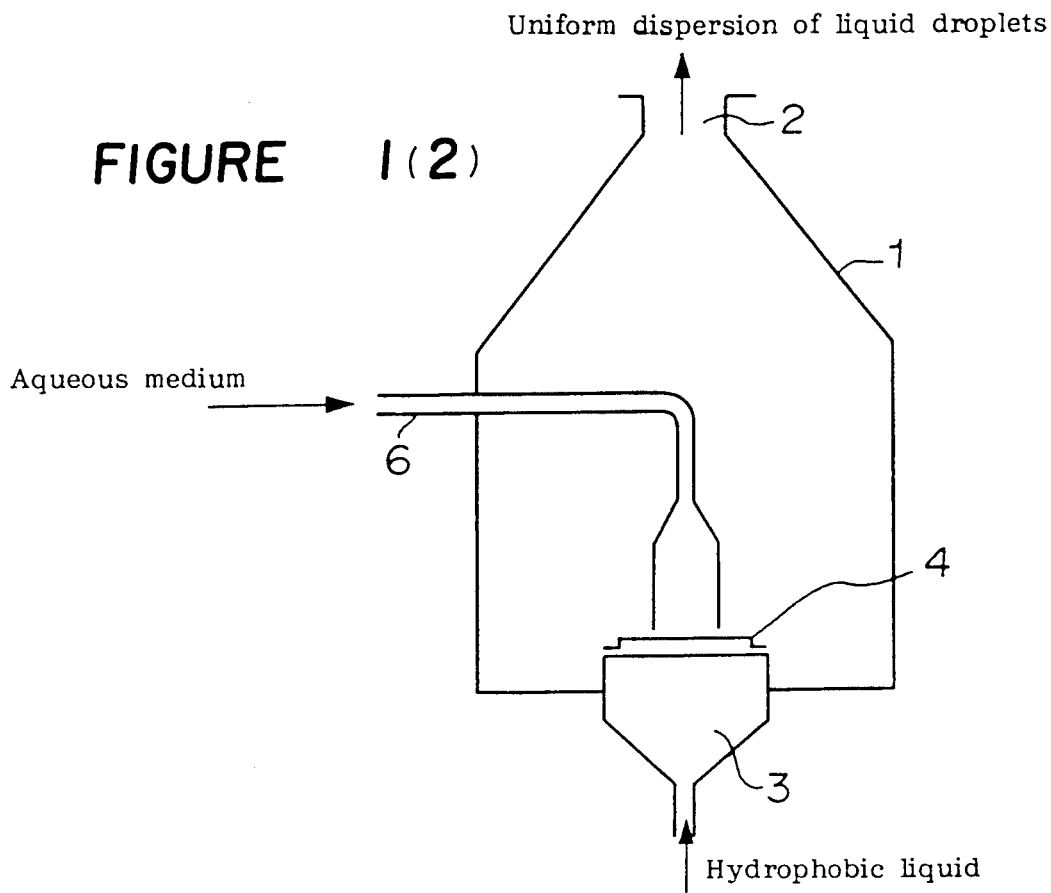

In these Figures, reference numeral 1 indicates the main body of the apparatus, numeral 2 indicates an outlet for the formed dispersion, numeral 3 indicates an inlet for the monomer, numeral 4 indicates the nozzle plate, numeral 5 indicates the perforations for ejection, and numeral 6 indicates an inlet for the aqueous medium.

In the method for preparing an oil-in-water type dispersion of liquid droplets according to the present invention, the aqueous medium is usually water, which may contain various additives composed of water-soluble compounds such as inorganic salts, as the case requires. The aqueous medium contains a dispersion stabilizer. Such a dispersion stabilizer may be of a conventional type and includes, for example, carboxymethyl cellulose, polyvinyl alcohol, gelatin and starch. The dispersion stabilizer is used usually in an amount of from 0.001 to 1% by weight, preferably from 0.03 to 0.1% by weight, relative to the hydrophobic liquid.

On the other hand, the hydrophobic liquid is usually an organic liquid which is not compatible with water and which is capable of forming liquid droplets in water. For example, the solubility of such a hydrophobic liquid in water is at most 1% (25° C). The specific gravity of the hydrophobic liquid is required to be smaller than the aqueous medium. Usually, the specific gravity of the hydrophobic liquid is preferably from 0.7 to 0.95 time relative to the aqueous medium. The specific gravities of both liquids can be adjusted by dissolving suitable components to the respective liquids. Such components may suitably be selected depending upon the particular purposes. In particular, in a case where the dispersion prepared by the method of the present invention is to be used for the polymerization method for preparing polymer beads of uniform particle size, the hydrophobic liquid is a polymerizable monomer containing a polymerization initiator.

The polymerizable monomer may, for example, be a mixture of styrene and divinyl benzene or a mixture of a (meth)acrylate and divinyl benzene. The polymerizable monomer may further contain a small amount of other monomer such as acrylonitrile or an acrylate. In some cases, this polymerizable monomer may be used as a mixture with an inert organic solvent such as octane, heptane or toluene or with a oil-soluble polymer such as polystyrene.

The polymerization initiator may be an oil-soluble conventional polymerization initiator such as benzoyl peroxide or azobisisobutyronitrile. The polymerization initiator is used usually in an amount of from 500 to 30,000 ppm, preferably from 500 to 10,000 ppm, relative to the monomer component.

Now, the method for preparing an oil-in-water type dispersion of the present invention will be prescribed in detail with reference to a specific case of preparing a dispersion for the suspension polymerization of a monomer comprising styrene and divinyl benzene in water, with reference to the accompanying drawings. However, it should be understood that the present invention is not limited to such a specific case where the hydrophobic liquid is a monomer comprising styrene and divinyl benzene.

Figure 2:
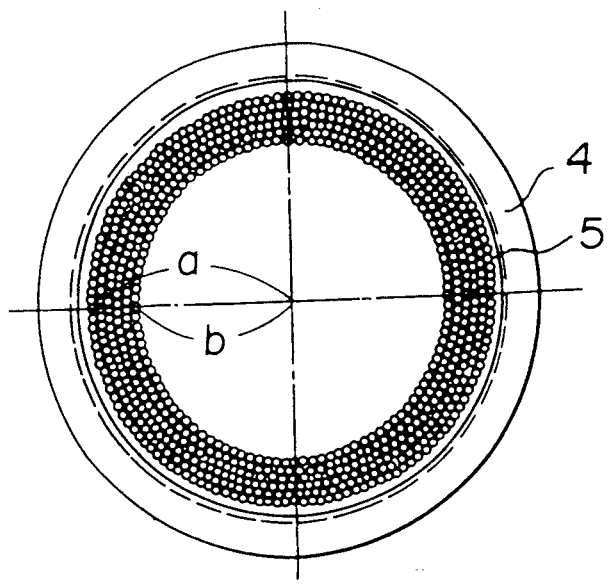
FIG. 2 is a plan view illustrating the arrangement in the ring form of perforations provided on the nozzle plate of the same apparatus.
Figure 3:
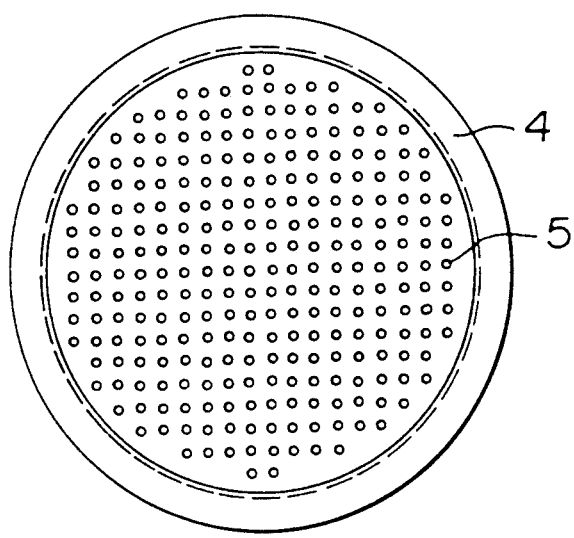
FIGS. 3 and 4 are plan views illustrating the uniform arrangements of perforations of nozzle plates in Comparative Examples.
Figure 4:
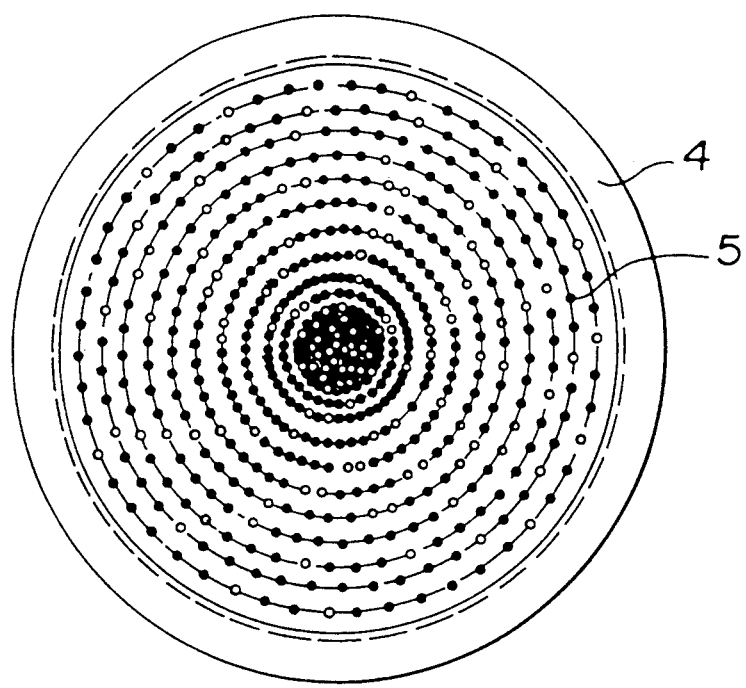

FIGS. 1(1) and 1(2) are side views illustrating different embodiments of the apparatus for preparing the dispersion to be used for the method of the present invention. FIG. 2 is a plan view illustrating the arrangement of the perforations for ejection provided on the nozzle plate of the same apparatus. FIGS. 3 and 4 are plan views illustrating the arrangements of the perforations of the nozzle plates in the comparative examples.

In the Figures, reference numeral 1 indicates the main body of the apparatus, numeral 2 indicates an outlet for the formed dispersion, numeral 3 indicates a monomer inlet, numeral 4 indicates a nozzle plate, numeral 5 indicates perforations for ejection, and numeral 6 indicates an inlet for the aqueous medium.

At an upper portion of the apparatus (tank) 1 for the preparation of the dispersion, an outlet 2 for discharging the formed dispersion is provided, so that the oil-in-water type dispersion formed in the apparatus is continuously discharged out of the system. This dispersion is usually supplied to a polymerization reactor and subjected to polymerization.

On the other hand, at a lower portion, a monomer inlet 3 and an inlet 6 for the aqueous medium are provided. At the forward end of the monomer inlet 3, a nozzle plate 4 having a number of perforations 5 for ejection is attached. The perforations 5 for ejection are provided horizontally, so that the monomer is ejected straightly upwardly.

In the present invention, it is required that perforations 5 in the nozzle plate 4 are provided in the form of a ring as shown in FIG. 2. Namely, in a case where perforations are provided uniformly over the entire surface as shown in FIG. 3, if the number of perforations for ejection is increased to improve the productivity, the swaying of monomer droplets in the vicinity of the perforations for ejection tends to be vigorous at the time of forming liquid droplets of the monomer discharged in the aqueous medium, whereby it tends to be difficult to obtain a uniform dispersion. Therefore, in the present invention, perforations for ejection are provided in the form of a ring without providing perforations at the center of the nozzle plate, so that an adequate amount of the aqueous medium is permitted to flow between liquid droplets from both sides of the formed stream of liquid droplets of the monomer (from the peripheral portion and the center portion of the nozzle plate), and the swaying of the liquid droplets in the vicinity of the perforations for ejection is prevented as far as possible. Accordingly, in the present invention, it is possible to increase the density of perforations 5 for ejection. Consequently, it is possible to provide a larger amount of perforations for ejection.

The ring form of the perforations 5 for ejection is usually such that the radius of the center portion of the nozzle plate where no perforations for ejection exist, is from 1.5 to 25 times the width of the ring portion where the perforations for ejection exist. Namely, in FIG. 2, it is preferred that $b/a = 0.6-0.96$. The size of perforations is determined depending upon the desired size of liquid droplets. Usually, the diameter of each perforation is from 0,01 to 0.4 mm.

In an industrial apparatus, the number of perforations 5 is usually from 100 to 100,000, preferably from 500 to 20,000. In such a case, the diameter of the nozzle plate is from 5 to 200 cm, preferably from 10 to 100 cm.

The perforations are arranged at a certain distance from one another so that the liquid droplet-forming phenomenon is not adversely affected by the adjacent ejected streams. When perforations are disposed with a distance between the adjacent perforations of at least 6 times the desired diameter of the liquid droplets, the adjacent ejected streams do not substantially interfere with each other.

The inlet 6 for the aqueous medium is designed to supply the aqueous medium into the apparatus, and it is attached at a position below the dispersion-forming region. It is further preferred that the inlet 6 is provided in the vicinity of the center of the nozzle plate at a position not to cover the perforations for ejection, since it is thereby possible to maintain liquid droplets uniformly even when the number of perforations 5 is further increased. Specifically, a method may be mentioned wherein as shown in FIG. 1(2), the inlet for the aqueous medium is located above the center of the nozzle plate at a position close to the nozzle plate, and the aqueous medium is supplied from the inlet towards the nozzle plate so that it is supplied radially on the surface of the nozzle plate.

In such a case, the distance between the forward end of the inlet for the aqueous medium and the nozzle plate is usually from 20 to 500 times the diameter of perforations. Otherwise, it is also possible that an inlet for the aqueous medium is provided directly at the center portion of the nozzle plate where no perforations exist (not shown), and the aqueous medium is supplied therefrom upwardly.

The aqueous medium is supplied in an amount to supplement the amount of the aqueous medium accompanying the group of liquid droplets moving upwards, at a flow rate not to adversely affect the liquid droplet forming phenomenon to a position in the vicinity of the ejected streams of the hydrophobic liquid.

To form an oil-in-water type uniform dispersion of liquid droplets by means of this apparatus for the production of a dispersion, it is usual that an aqueous medium containing a dispersion stabilizer is filled in the main body of the apparatus 1, then a predetermined amount of an aqueous medium is continuously supplied from the inlet 6 for the aqueous medium, while continuously ejecting into the aqueous medium a monomer containing a polymerization initiator from the perforations 5 for ejection of the nozzle plate 4 provided at the forward end of the monomer inlet 3, whereby liquid droplets of the monomer are formed in the aqueous medium to form an oil-in-water type dispersion. The formed dispersion rises in the apparatus and is continuously discharged from the outlet 2 for the formed dispersion, which is located at an upper portion.

In each of the method for preparing an oil-in-water type uniform dispersion of liquid droplets and the polymerization method, the amount of the hydrophobic liquid to be supplied is determined depending upon the concentration of the desired dispersion. Usually, it is from 0.1 to 0.7 time by volume, preferably from 0.3 to 0.5 time by volume, relative to the amount of the aqueous medium supplied. Accordingly, when the aqueous medium and the hydrophobic liquid are supplied, it is necessary to control the flow rates of the respective supply tubes so that the ratio of the two materials becomes constant. The ejected streams of the hydrophobic liquid have a flow rate of from 20 to 1,000, preferably from 30 to 300 as defined by a non-dimensional Reynolds number (Re). This Reynolds number is represented by a value obtained by dividing the product of the hydrophobic liquid density ($\rho$) indicated by g/cm$_3$ (when the hydrophobic liquid is a polymerizable monomer, the monomer contains the polymerization initiator and other contents), the average ejection velocity (u) of the hydrophobic liquid indicated by cm/sec and the inner diameter (d) of the perforations for ejection indicated by cm, by a hydrophobic liquid viscosity ($\mu$) indicated by $$\text{poise} \left( \text{i.e. } Re = \frac{\rho u d}{\mu} \right).$$

In the present invention, the temperatures of the aqueous medium and the hydrophobic liquid are usually preferably at the same level. Further, the temperature is preferably at a low level such as from 0 to 40° C., more preferably from 10 to 30° C.

In the oil-in-water type dispersion prepared by the method of this invention, liquid droplets of the hydrophobic liquid are uniform.

The present invention is applicable not only to the above mentioned preparation of a dispersion for suspension polymerization, but also to preparation of an oil-in-water type dispersion for conducting a chemical reaction utilizing the interface between an aqueous medium and an organic solvent, or to preparation of an oil-in-water type dispersion useful for extracting a component in an organic solvent with an aqueous medium.

The size of the liquid droplets in the oil-in-water type dispersion prepared by the method of the present invention is usually from 30 to 3,000 $\mu$m, particularly from 50 to 1,000 $\mu$m.

Another object of the present invention is to provide a polymerization method which comprises preparing an oil-in-water type uniform dispersion of liquid droplets by the above mentioned method for preparing the oil-in-water type dispersion of liquid droplets using a polymerizable monomer containing a polymerization initiator as the hydrophobic liquid, and then subjecting the dispersion to a usual polymerization step. Namely, the present invention also provides a polymerization method for preparing polymer beads of uniform particle size, which comprises forming a dispersion of a polymerizable monomer of uniform droplet size in an apparatus having an outlet at an upper portion and inlets for a monomer and an aqueous medium at a lower portion, continuously discharging the dispersion from the upper outlet, introducing the dispersion to a polymerization reactor under such condition that the monomer droplets of uniform size in the discharged dispersion would not be destroyed or would not aggregate and polymerizing the monomer under such condition that the monomer droplets of uniform size in the dispersion would not be destroyed and at a polymerization temperature, wherein an aqueous medium containing a dispersion stabilizer is continuously supplied to the apparatus for forming the dispersion of the monomer of uniform droplet size, which is filled with the aqueous medium, to form a continuous phase of the aqueous medium moving upwards and being continuously discharged from the upper outlet; the forward end of the monomer inlet at the lower portion is a nozzle plate having a number of perforations for ejection arranged in a ring form; and a polymerizable monomer containing a polymerization initiator is ejected through the nozzle plate upwards into the apparatus.

As a method for preparing a dispersion of a polymerizable monomer of uniform size in the polymerization method of the present invention, it is possible to employ the method as described above in detail for the method for preparing an oil-in-water type uniform dispersion of liquid droplets of the present invention.

The oil-in-water type uniform dispersion of liquid droplets of the present invention may by itself be supplied to a polymerization reactor under such a condition that the dispersed liquid droplets would not be destroyed, and then heated to a polymerization temperature to conduct suspension polymerization, whereby polymer particles (beads) having a uniform size can be recovered.

In the polymerization method of the present invention, various conventional methods may be employed for the polymerization step. For such a polymerization step, known methods as disclosed in U.S. patents 3,922,255 and 4,444,961 may preferably be employed. Those U.S. patents are incorporated by reference herein.

Further, the polymerization step of the present invention is preferably conducted under mild stirring not to destroy monomer liquid droplets.

The polymerization temperature is usually from 60 to 90° C., and the polymerization time is usually from 5 to 20 hours.

Further, for the preparation of a dispersion of monomer liquid droplets in the polymerization method of the present invention, a mechanical vibrating means may be provided for the nozzle plate so that vibration is imparted to ejected streams of the monomer. However, such vibration is not necessarily required in the dispersing method of the present invention. Besides, in a case where the number of perforations of the nozzle plate is large and the perforations are close to one another, a turbulent flow such as swaying of the ejected streams of the monomer, is likely to take place. Therefore, vibration may not necessarily be imparted.

Now, the present invention will be described in further detail with reference to Examples. However, it should be understood that the present invention is by no means restricted to such specific Examples.

EXAMPLE 1

An experiment was conducted using an apparatus for producing a dispersion having a structure as shown in FIG. 1(1) provided with a nozzle plate shown in FIG. 2.

A nozzle plate 4 having an outer diameter of 100 mm was provided in the main body 1 of the apparatus (inner diameter: 0.3 m, height: 0.4 m). On the nozzle plate 4, perforations 5 for ejection having a diameter of 0.08 mm are arranged in a ring form having an inner diameter of 70 mm, an outer diameter of 90 mm and a width of 10 mm, whereby the distances between the perforations were at least 2 mm, and the total number of perforations was 751.

An aqueous medium containing 0.1% of polyvinyl alcohol was charged fully in the main body (tank) 1 of the apparatus, and styrene monomer was ejected from the perforations 5 for ejection at a flow rate of 150 cm/sec (Reynolds number Re = 121).

Supply of an aqueous medium containing 0.1% of polyvinyl alcohol was conducted continuously at a flow rate of 1,000 cc/min from the vicinity of the bottom of the main body of the apparatus so as not to adversely affect the liquid droplet forming phenomenon.

The operational temperature was maintained at a level of from 20 to 25° C. with respect to the interior of the main body 1 of the apparatus, the supplied monomer and the aqueous medium.

The formed uniform dispersion of liquid droplets was continuously recovered from the outlet 2 for discharging the uniform dispersion of liquid droplets.

The average size of liquid droplets thereby obtained was 0.26 mm, and the liquid droplets having particle sizes within the average particle size ±10% constituted 70% by volume.

EXAMPLE 2

An experiment was conducted by means of an apparatus for preparing a dispersion having a structure as shown in FIG. 1(2) in the method of Example 1.

As the tube 6 for supplying the aqueous medium, a tube having an inner diameter of 15 mm was used, and the tube was disposed at the center of the nozzle plate with a distance of 5 mm from the nozzle plate surface. When the aqueous medium was supplied at the same flow rate as in Example 1, the formed liquid droplets were found to be improved to such an extent that liquid droplets having particle sizes within the average particle size ±10% constituted 85% by volume.

COMPARATIVE EXAMPLE 1

In the method of Example 1, a dispersion was prepared under the same conditions using a nozzle plate having a structure as shown in FIG. 3 (the number of perforations for ejection was the same as in Example 1), whereby among the liquid droplets in the oil-in-water type dispersion thereby obtained, those having particle sizes within the average particle size ±10% constituted 60%.

COMPARATIVE EXAMPLE 2

In the method of Example 1, a dispersion was prepared under the same conditions using a nozzle plate having a structure as shown in FIG. 4 (perforations were arranged concentrically with the density lower towards the outer periphery, and the number of perforations for ejection was 562), whereby among the liquid droplets in the oil-in-water type dispersion thereby obtained, those having particle sizes within the average particle size ±10% constituted 62%.

EXAMPLE 3

An experiment was conducted in the same manner as in Example 2 except that instead of the styrene monomer, a mixture comprising 10.5% by weight of divinyl benzene with a purity of 56% (containing ethylvinyl benzene), 88.5% by weight of styrene and 1% by weight of benzoyl peroxide, was used as the hydrophobic liquid. The average particle size of the liquid droplets thereby obtained was 0.26 mm, and the liquid droplets having particle sizes within the average particle size ±10% was 85% by volume. The liquid droplets thus obtained were introduced from the outlet 2 to a polymerization reactor equipped with a stirrer. Then, polymerization was conducted at 80° C. for 8 hours under mild stirring not to upset the particle size distribution of the liquid droplets. After the polymerization, polymer particles were obtained by filtration, which had an average particle size of 0.24 mm. The polymer particles having particle sizes within the average particle size ±10% constituted 84% by volume.

EXAMPLE 4

In Example 2, the styrene monomer was ejected from the outlet 5 for ejection at a flow rate of from 180 cm/sec (Reynolds number Re = 146). The average particle size of liquid droplets thereby obtained was 0.27 mm, and liquid droplets having particle sizes within the average particle size ±10% constituted 84% by volume.

EXAMPLE 5

In Example 3, formation of the liquid droplets and polymerization were conducted using a mixture comprising divinyl benzene having a purity of 56% (including ethylvinyl benzene), 50.2% by weight of styrene, 40.9% by weight of isooctane and 0.6% by weight of benzoyl peroxide.

The polymer particles thereby obtained had an average particle size of 0.25 mm, and those having particle sizes within the average particle size ±10% constituted 77% by volume.

What is claimed is:

1. A method for preparing an oil-in-water type uniform dispersion of liquid droplets, which comprises ejecting into an aqueous medium containing a dispersion stabilizer, which forms a continuous phase and moves upwards, a hydrophobic liquid having a specific gravity smaller than the aqueous medium, through a nozzle plate having a plurality of perforations capable of ejecting the hydrophobic liquid upwards, to form liquid droplets of the hydrophobic liquid in the aqueous medium, wherein a nozzle plate having a number of perforations for ejection arranged in a ring form is used as said nozzle plate.

2. The method for preparing an oil-in-water type uniform dispersion of liquid droplets according to claim 1, wherein an inlet for the aqueous medium is provided in the vicinity of the center of the nozzle plate at a position not to cover the perforations for ejection, and the aqueous medium is continuously supplied from said inlet.

3. The method for preparing an oil-in-water type uniform dispersion of liquid droplets according to claim 2, wherein the inlet for the aqueous medium is located above the center of the nozzle plate at a position close to the nozzle plate, and the aqueous medium is supplied from the inlet towards the nozzle plate so that it is supplied radially on the surface of the nozzle plate.

4. The method for preparing an oil-in-water type uniform dispersion of liquid droplets according to claim 1, wherein the inlet for the aqueous medium is located outside the nozzle plate at a position lower than the nozzle plate.

5. The method for preparing an oil-in-water type uniform dispersion of liquid droplets according to claim 1, wherein the inlet for the aqueous medium is located at the center of the nozzle plate where no perforations for ejection exist, and the aqueous medium is supplied therefrom in the same upward direction as the hydrophobic liquid.

6. The method for preparing an oil-in-water type uniform dispersion of liquid droplets according to claim 1, wherein the radius of the center portion of the nozzle plate where no perforations for ejection exist, is from 1.5 to 25 times the width of the ring portion where the perforations for ejection exist.

7. The method for preparing an oil-in-water type uniform dispersion of liquid droplets according to claim 1, wherein the diameter of each perforation provided on the nozzle plate is from 0.01 to 0.4 mm.

8. The method for preparing an oil-in-water type uniform dispersion of liquid droplets according to claim 1, wherein the distance between adjacent perforations provided on the nozzle plate is at least 6 times the diameter of the liquid droplets finally formed.

9. The method for preparing an oil-in-water type uniform dispersion of liquid droplets according to claim 1, wherein the nozzle plate has a diameter of from 5 to 200 cm, and the number of perforations for ejection is from 100 to 100,000.

10. The method for preparing an oil-in-water type uniform dispersion of liquid droplets according to claim 3, wherein the distance between the inlet for the aqueous medium and the nozzle plate is from 20 to 500 times the diameter of perforations.

11. The method for preparing an oil-in-water type uniform dispersion of liquid droplets according to claim 1, wherein the aqueous medium comprises water and a dispersion stabilizer as the main components.

12. The method for preparing an oil-in-water type uniform dispersion of liquid droplets according to claim 1, wherein the dispersion stabilizer is selected from the group consisting of carboxymethyl cellulose, polyvinyl alcohol, gelatin and starch.

13. The method for preparing an oil-in-water type uniform dispersion of liquid droplets according to claim 1, wherein the dispersion stabilizer is used in an amount of from 0.001 to 1% by weight relative to the hydrophobic liquid.

14. The method for preparing an oil-in-water type uniform dispersion of liquid droplets according to claim 1, wherein the hydrophobic liquid comprises a polymerizable monomer and a polymerization initiator as the main components and further contains or does not contain an inert organic solvent and an oil-soluble polymer.

15. The method for preparing an oil-in-water type uniform dispersion of liquid droplets according to claim 1, wherein the hydrophobic liquid is supplied in an amount of from 0.1 to 0.7 time by volume of the amount of the aqueous medium supplied.

16. The method for preparing an oil-in-water type uniform dispersion of liquid droplets according to claim 1, wherein the hydrophobic liquid is ejected at a flow rate defined by the value of the non-dimensional Reynolds number (Re) of the following formula being from 20 to 1,000:

$$Re = \frac{\rho u d}{\mu}$$

where $\rho$ is the density (g/cm$^3$) of the hydrophobic liquid, u is an average velocity of ejection (cm/sec) of the hydrophobic liquid, d is the diameter (cm) of the perforations for ejection of the nozzle plate, and $\mu$ is the viscosity (poise) of the hydrophobic liquid.

17. The method for preparing an oil-in-water type uniform dispersion of liquid droplets according to claim 1, wherein the polymerizable monomer is a monomer mixture comprising styrene and divinyl benzene as the main component.

18. The method for preparing an oil-in-water type uniform dispersion of liquid droplets according to claim 14, wherein the polymerization initiator is benzoyl peroxide or azobisisobutyronitrile.

19. The method for preparing an oil-in-water type uniform dispersion of liquid droplets according to claim 14, wherein the polymerization initiator is used in an amount of from 500 to 30,000 ppm relative to the monomer component.

20. The method for preparing an oil-in-water type uniform dispersion of liquid droplets according to claim 14, wherein the temperatures of the aqueous medium and the hydrophobic liquid are substantially equal.

21. The method for preparing an oil-in-water type uniform dispersion of liquid droplets according to claim 14, wherein the temperature of the aqueous medium and the hydrophobic liquid are substantially equal and are at a level where the polymerization cannot start.

22. The method for preparing an oil-in-water type uniform dispersion of liquid droplets according to claim 1, wherein the temperatures of the aqueous medium and the hydrophobic liquid are both within a range of from 0 to 40° C.

23. The method for preparing an oil-in-water type uniform dispersion of liquid droplets according to claim 1, wherein the specific gravity of the hydrophobic liquid to the aqueous medium is from 0.7 to 0.95 time.

24. A polymerization method for preparing polymer beads of uniform particle size, which comprises forming a dispersion of a polymerizable monomer of uniform droplet size in an apparatus having an outlet at an upper portion, and inlets for a monomer and an aqueous medium at a lower portion, continuously discharging the dispersion from the upper outlet, introducing the dispersion to a polymerization reactor under such condition that the monomer droplets of uniform size in the discharged dispersion would not be destroyed or would not aggregate and polymerizing the monomer under such condition that the monomer droplets of uniform size in the dispersion would not be destroyed and at a polymerization temperature, wherein an aqueous medium containing a dispersion stabilizer is continuously supplied to the apparatus for forming the dispersion of the monomer of uniform droplet size, which is filled with the aqueous medium, to form a continuous phase of the aqueous medium moving upwards and being continuously discharged from the upper outlet; the forward end of the monomer inlet at the lower portion is a nozzle plate having a number of perforations for ejection arranged in a ring form; and a polymerizable monomer containing a polymerization initiator is ejected through the nozzle plate upwards into the apparatus.

25. The polymerization method for preparing polymer beads of uniform particle size according to claim 24, wherein in the apparatus for forming the dispersions of the monomer of uniform droplet size, the inlet for the aqueous medium is provided in the vicinity of the center of the nozzle plate at a position not to cover the perforations for ejection.

26. The polymerization method for preparing polymer beads of uniform particle size according to claim 24, wherein in the apparatus for forming the dispersion of the monomer of uniform droplet size, the polymerizable monomer is supplied in an amount of from 0.1 to 0.7 time by volume of the amount of the aqueous medium supplied.

27. The polymerization method for preparing polymer beads of uniform particle size according to claim 24, wherein in the apparatus for forming the dispersion of the monomer of uniform droplet size, the polymerizable monomer is ejected at a flow rate defined by the value of the non-dimensional Reynolds number (Re) of the following formula being from 20 to 1,000:

$$Re = \frac{\rho u d}{\mu}$$

where $\rho$ is the density (g/cm$^3$) of the polymerizable monomer containing a polymerization initiator and other contents, u is an average velocity of ejection (cm/sec) of the polymerizable monomer, d is the diameter (cm) of the perforations for ejection of the nozzle plate, and $\mu$ is the viscosity (poise) of the polymerizable monomer.

28. The polymerization method for preparing polymer beads of uniform particle size according to claim 24, wherein the polymerizable monomer is a monomer mixture comprising styrene and divinyl benzene as the main component.

29. The polymerization method for preparing polymer beads of uniform particle size according to claim 24, wherein the polymerization initiator is benzoyl peroxide or azobisisobutyronitrile.

30. The polymerization method for preparing polymer beads of uniform particle size according to claim 24, wherein the polymerization initiator is used in an amount of from 500 to 30,000 ppm relative to the monomer component.

31. The polymerization method for preparing polymer beads of uniform particle size according to claim 24, wherein the temperatures of the aqueous medium and the polymerizable monomer are substantially equal and are at a level where the polymerization cannot start.

32. The polymerization method for preparing polymer beads of uniform particle size according to claim 31, wherein the temperature of the aqueous medium and the polymerizable monomer in the apparatus for forming the dispersion of the monomer of uniform droplet size are both within a range of from 0 to 40° C.

33. The polymerization method for preparing polymer beads of uniform particles size according to claim 24, wherein the specific gravity of the polymerizable monomer to the aqueous medium is from 0.7 to 0.95 time.

34. The polymerization method for preparing polymer beads of uniform particle size according to claim 24, wherein the aqueous medium for the dispersion of the monomer of uniform droplet size comprises water and a dispersion stabilizer as the main components.

35. The polymerization method for preparing polymer beads of uniform particle size according to claim 24, wherein the dispersion stabilizer for the dispersion of the monomer of uniform droplet size is selected from the group consisting of carboxymethyl cellulose, polyvinyl alcohol, gelatin and starch.

36. The polymerization method for preparing polymer beads of uniform particle size according to claim 24, wherein the dispersion stabilizer for the dispersion of the monomer of uniform droplet size is used in an amount of from 0.001 to 1% by weight relative to the monomer.

* * * * *